US011315215B2

(12) United States Patent
Burgoyne et al.

(10) Patent No.: US 11,315,215 B2
(45) Date of Patent: Apr. 26, 2022

(54) MOVEMENT WITHIN AN ENVIRONMENT

(71) Applicant: Apple Inc., Cupertino, CA (US)

(72) Inventors: Ryan S. Burgoyne, Sunnyvale, CA (US); Bradley Peebler, Redwood City, CA (US); Philipp Rockel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 16/796,747

(22) Filed: Feb. 20, 2020

(65) Prior Publication Data
US 2020/0273146 A1 Aug. 27, 2020

Related U.S. Application Data

(60) Provisional application No. 62/809,362, filed on Feb. 22, 2019.

(51) Int. Cl.
*G06T 3/40* (2006.01)
*G06T 19/00* (2011.01)
*G06V 20/20* (2022.01)

(52) U.S. Cl.
CPC .............. *G06T 3/40* (2013.01); *G06T 19/006* (2013.01); *G06V 20/20* (2022.01)

(58) Field of Classification Search
CPC ......... G06T 3/40; G06T 19/006; G06T 15/20; G06T 2219/2016; G06T 2219/028;
(Continued)

(56) References Cited

U.S. PATENT DOCUMENTS 7,889,212 B2 * 2/2011 Schulz .................. G06F 3/0481
345/428
2016/0350972 A1 * 12/2016 Kauffmann ............. G06F 3/011
(Continued)

FOREIGN PATENT DOCUMENTS

JP 2013-250830 A 12/2013
JP 2017-84422 A 5/2017

OTHER PUBLICATIONS

International Preliminary Report on Patentability received for PCT Patent Application No. PCT/US2019/030120, dated Nov. 12, 2020, 10 pages.
(Continued)

*Primary Examiner* — Michael Le
(74) *Attorney, Agent, or Firm* — Dentons US LLP

(57) ABSTRACT

A magnified portion and an unmagnified portion of a computer-generated reality (CGR) environment are displayed from a first position. In response to receiving an input, a magnified portion of the CGR environment from a second position is displayed with a magnification less than that of the magnified portion of the CGR environment from the first position and a field of view greater than that of the magnified portion of the CGR environment from the first position. A first unmagnified portion of the CGR environment from a third position is displayed with a field of view greater than that of the magnified portion of the CGR environment from the second position. Then, a second unmagnified portion of the CGR environment from the third position is displayed with a field of view greater than that of the first unmagnified portion of the CGR environment from the third position.

20 Claims, 11 Drawing Sheets

(58) Field of Classification Search
CPC ......... G06T 19/20; G06T 3/4023; G06T 7/70; G06K 9/00671; G06F 3/011; G02B 27/0172; G06V 20/20
See application file for complete search history.

(56) References Cited

U.S. PATENT DOCUMENTS

| | | | |
|---|---|---|---|
| 2016/0353012 A1* | 12/2016 | Kao | H04N 5/23238 |
| 2017/0160815 A1* | 6/2017 | Glazier | G06F 3/017 |
| 2017/0308990 A1* | 10/2017 | Middleton | G06T 5/005 |
| 2018/0246565 A1* | 8/2018 | Moon | G06F 3/016 |
| 2021/0232288 A1* | 7/2021 | Deliz Centeno | G02B 27/0093 |

OTHER PUBLICATIONS

International Search Report and Written Opinion received for PCT Patent Application No. PCT/US2019/030120, dated Jul. 25, 2019, 11 pages.

Office Action received for Japanese Patent Application No. 2020-560953, dated Oct. 27, 2021, 6 pages (3 pages of English Translation and 3 pages of Official Copy).

* cited by examiner

300

---

302

Display a magnified portion of the CGR environment from a first position and an unmagnified portion of the CGR environment from the first position

↓

304

Receive an input

↓

306

Display a magnified portion of the CGR environment from a second position

↓

308

Display a first unmagnified portion of the CGR environment from a third position

↓

310

Display a second unmagnified portion of the CGR environment from the third position

FIG. 3

MOVEMENT WITHIN AN ENVIRONMENT

CROSS-REFERENCE TO RELATED APPLICATIONS

This application claims priority to U.S. Provisional Patent Application Ser. No. 62/809,362, titled "LOCOMOTION IN A COMPUTER-GENERATED REALITY ENVIRONMENT," filed on Feb. 22, 2019, the content of which is hereby incorporated by reference in its entirety.

BACKGROUND

1. Field

The present disclosure relates generally to computer-generated reality (CGR), and more specifically to techniques for moving in a CGR environment.

2. Related Art

Some CGR applications display the CGR environment from a particular position in the CGR environment. In some cases, the position represents the location of a user or a virtual camera within the CGR environment. In some applications, a user may desire to move within the CGR environment and/or view the CGR environment from a different position. Movement in a CGR environment need not correspond directly to the actual physical movement of the user in the real world. Indeed, a user can move great distances quickly in a CGR environment that would be infeasible in the real world. Perceptive users may recognize non-linearity between movement in CGR relative to movement in the real world.

BRIEF SUMMARY

The present disclosure describes techniques for changing the position from which a CGR environment is displayed. In embodiments in which the position represents the position of a user within the CGR environment, changing the position allows a user to move within the CGR environment. The techniques described below allow a user to smoothly transition from one location to another within a CGR environment while maintaining context (e.g., of where the user moved to relative to where the user was previously).

In some embodiments, a method for moving about a CGR environment includes displaying a magnified portion of the CGR environment from a first position and an unmagnified portion of the CGR environment from the first position. An input is received, and in response to receiving the input: a magnified portion of the CGR environment from a second position is displayed, a first unmagnified portion of the CGR environment from a third position is displayed, and, after displaying the first unmagnified portion of the CGR environment from the third position, a second unmagnified portion of the CGR environment from the third position is displayed. The magnified portion of the CGR environment from the second position has a magnification less than a magnification of the magnified portion of the CGR environment from the first position. The magnified portion of the CGR environment from the second position has a field of view greater than a field of view of the magnified portion of the CGR environment from the first position. The first unmagnified portion of the CGR environment from the third position has a field of view greater than the field of view of the magnified portion of the CGR environment from the second position. The second unmagnified portion of the CGR environment from the third position has a field of view greater than the field of view of the first unmagnified portion of the CGR environment from the third position.

In some embodiments, a transitory or non-transitory computer-readable storage medium stores one or more programs configured to be executed by one or more processors of an electronic device. The one or more programs include instructions for displaying a magnified portion of a CGR environment from a first position and an unmagnified portion of the CGR environment from the first position. The one or more programs further include instructions for receiving an input and, in response to receiving the input: displaying a magnified portion of the CGR environment from a second position, displaying a first unmagnified portion of the CGR environment from a third position, and, after displaying the first unmagnified portion of the CGR environment from the third position, displaying a second unmagnified portion of the CGR environment from the third position. The magnified portion of the CGR environment from the second position has a magnification less than a magnification of the magnified portion of the CGR environment from the first position. The magnified portion of the CGR environment from the second position has a field of view greater than a field of view of the magnified portion of the CGR environment from the first position. The first unmagnified portion of the CGR environment from the third position has a field of view greater than the field of view of the magnified portion of the CGR environment from the second position. The second unmagnified portion of the CGR environment from the third position having a field of view greater than the field of view of the first unmagnified portion of the CGR environment from the third position.

In some embodiments, an electronic device includes one or more processors and memory storing one or more programs configured to be executed by the one or more processors. The one or more programs include instructions for displaying a magnified portion of a CGR environment from a first position and an unmagnified portion of the CGR environment from the first position. The one or more programs further include instructions for receiving an input and, in response to receiving the input: displaying a magnified portion of the CGR environment from a second position, displaying a first unmagnified portion of the CGR environment from a third position, and, after displaying the first unmagnified portion of the CGR environment from the third position, displaying a second unmagnified portion of the CGR environment from the third position. The magnified portion of the CGR environment from the second position has a magnification less than a magnification of the magnified portion of the CGR environment from the first position. The magnified portion of the CGR environment from the second position has a field of view greater than a field of view of the magnified portion of the CGR environment from the first position. The first unmagnified portion of the CGR environment from the third position has a field of view greater than the field of view of the magnified portion of the CGR environment from the second position. The second unmagnified portion of the CGR environment from the third position having a field of view greater than the field of view of the first unmagnified portion of the CGR environment from the third position.

In some embodiments, an electronic device includes means for displaying a magnified portion of a CGR environment from a first position and an unmagnified portion of the CGR environment from the first position, means for receiving an input, and means responsive to receiving the input for: displaying a magnified portion of the CGR environment from a second position, displaying a first unmagnified portion of the CGR environment from a third position, and, after displaying the first unmagnified portion of the CGR environment from the third position, displaying a second unmagnified portion of the CGR environment from the third position. The magnified portion of the CGR environment from the second position has a magnification less than a magnification of the magnified portion of the CGR environment from the first position. The magnified portion of the CGR environment from the second position has a field of view greater than a field of view of the magnified portion of the CGR environment from the first position. The first unmagnified portion of the CGR environment from the third position has a field of view greater than the field of view of the magnified portion of the CGR environment from the second position. The second unmagnified portion of the CGR environment from the third position having a field of view greater than the field of view of the first unmagnified portion of the CGR environment from the third position.

BRIEF DESCRIPTION OF DRAWINGS

FIG. 3 depicts a flow chart of an exemplary process for moving in a CGR environment, according to various embodiments.

DETAILED DESCRIPTION

Figure 1A:
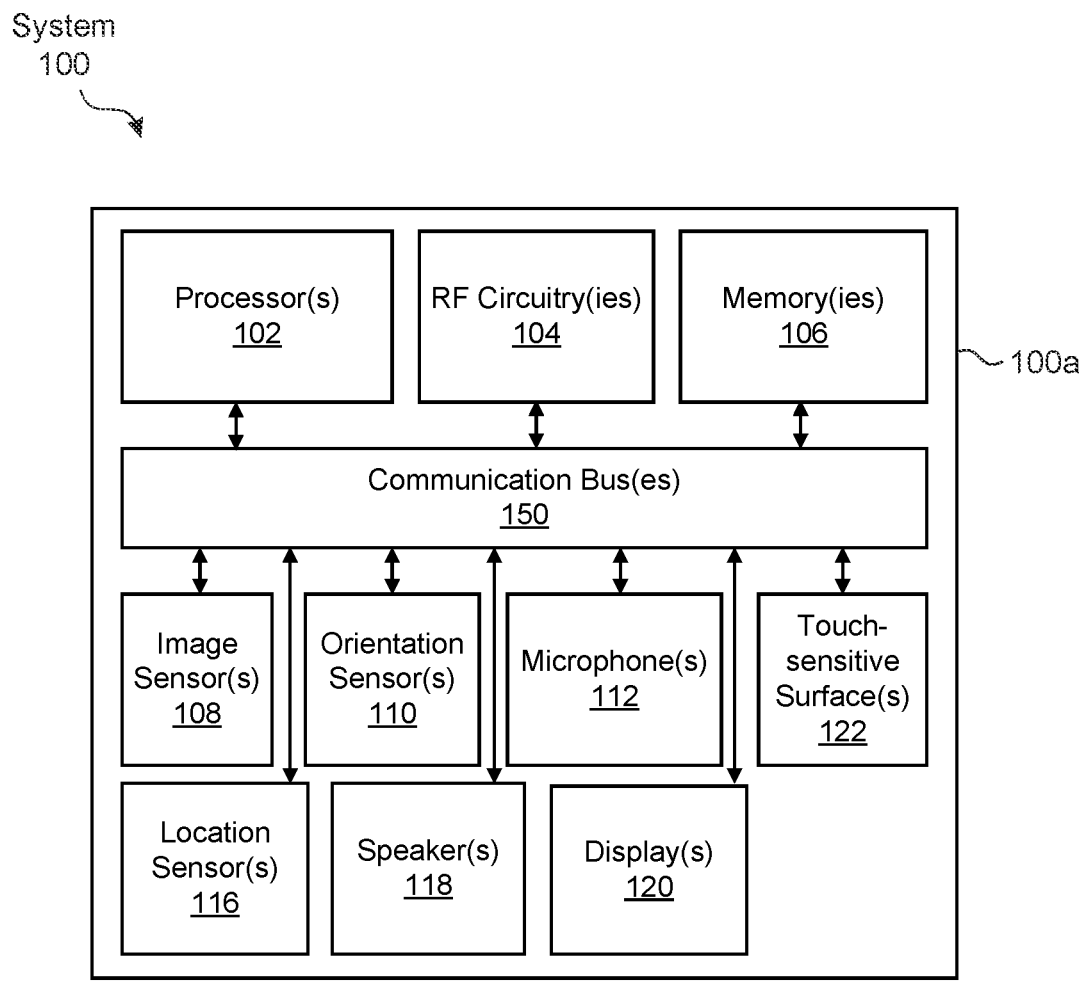
FIGS. 1A-1B depict exemplary systems for use in various computer-generated reality technologies.

Various embodiments of electronic systems and techniques for using such systems in relation to various CGR technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photo realistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
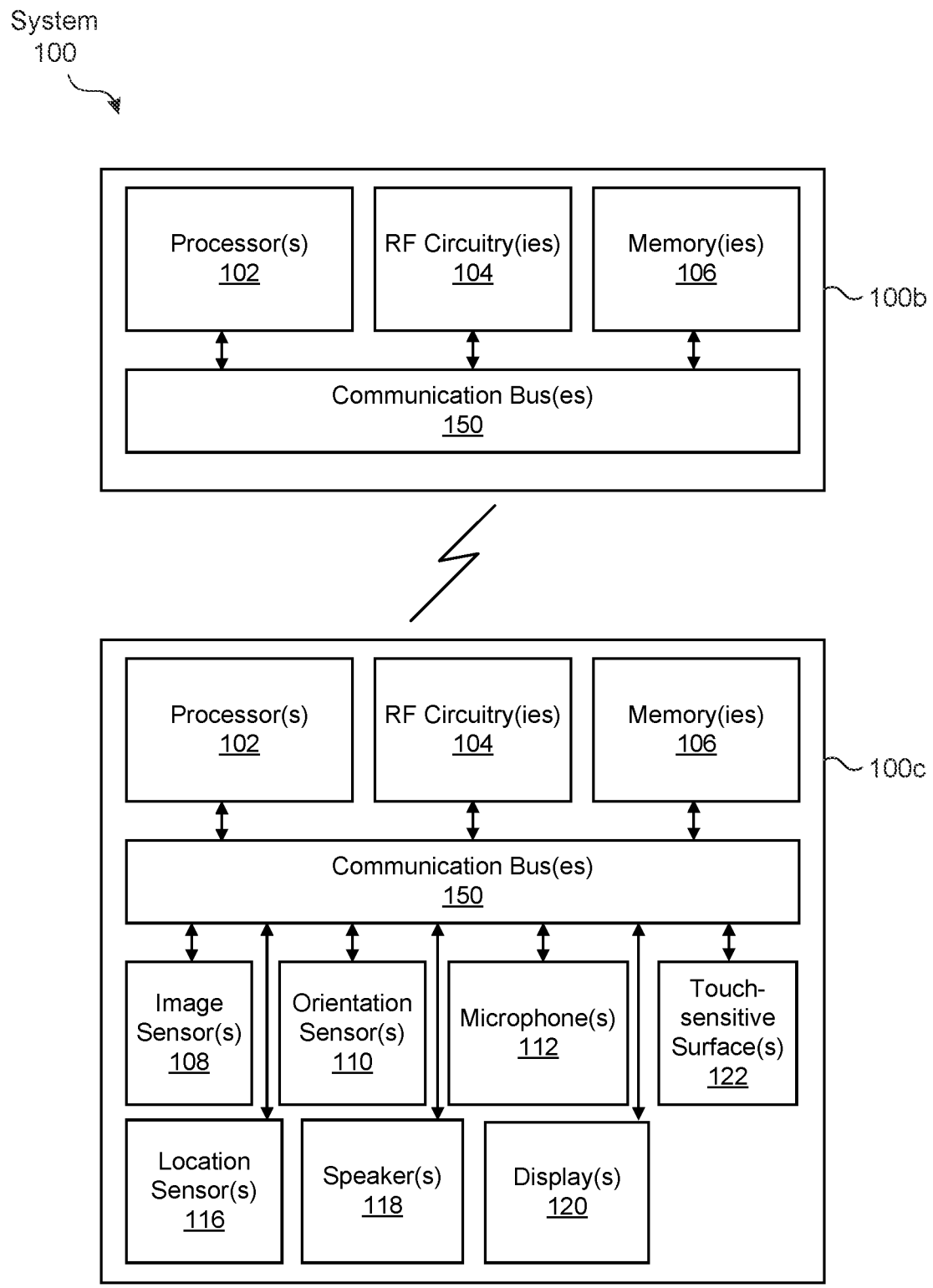

FIG. 1A and FIG. 1B depict exemplary system 100 for use in various computer-generated reality technologies.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some embodiments, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device. In some embodiments, system 100 is a head-mounted display (HMD) device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some embodiments, system 100 uses CCD sensors, event cameras, and depth sensors in combination to detect the physical environment around system 100. In some embodiments, image sensor(s) 108 include a first image sensor and a second image sensor. The first image sensor and the second image sensor are optionally configured to capture images of physical objects in the real environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some embodiments, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2A:
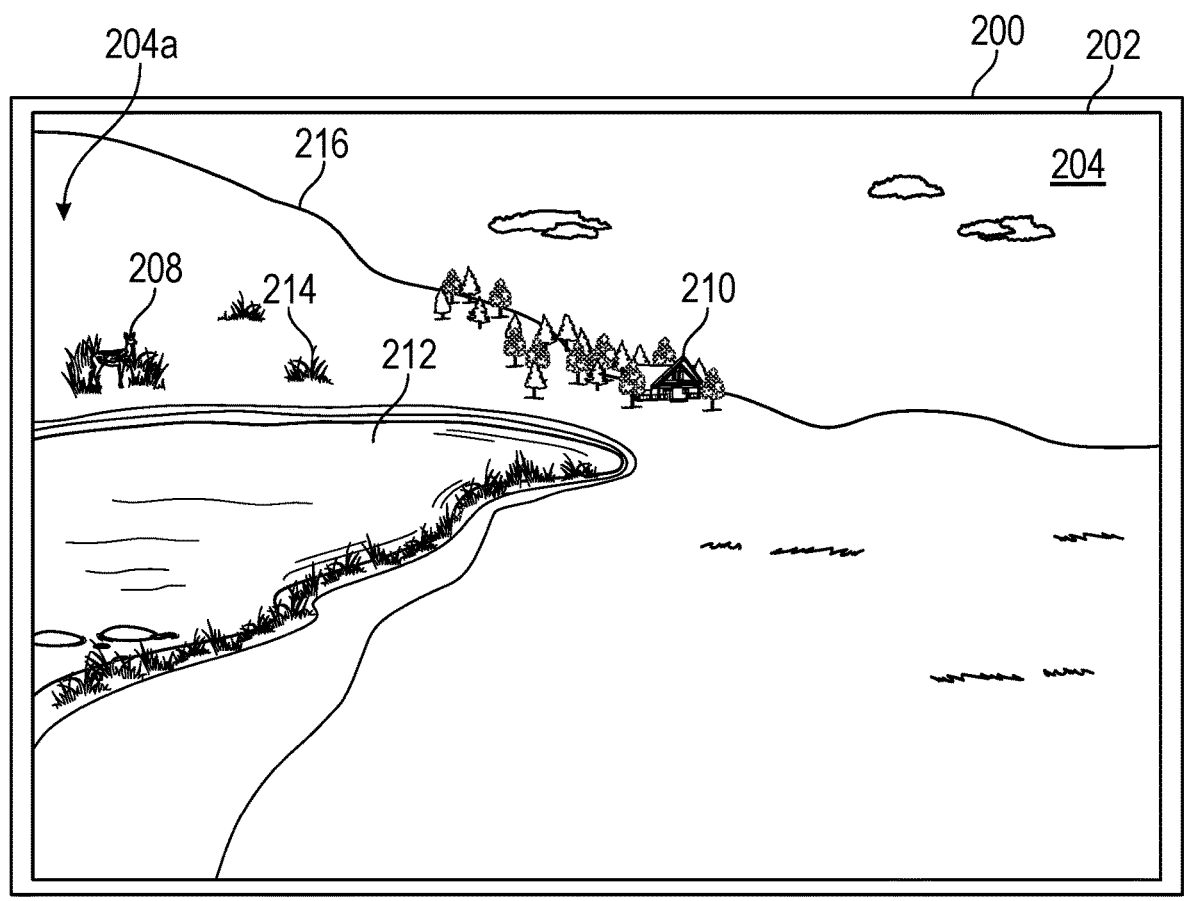
FIGS. 2A-2H illustrate techniques for moving in a CGR environment, according to various embodiments.

FIGS. 2A-2H illustrate techniques for moving about a CGR environment. FIG. 2A illustrates system 200, which includes display 202. In some embodiments, system 200 includes system 100, device 100a, device 100b, and/or device 100c. In some embodiments, display 202 is or includes displays 120, as described above. In FIG. 2A, system 200 displays CGR environment 204 on display 202.

As illustrated in FIG. 2A, CGR environment 204 is a VR environment. However, the techniques described with respect to CGR environment 204 can also be applied to MR environments, including AR environments and AV environments. In some embodiments, CGR environment 204 is displayed by device 100a, where device 100a is a mobile device, such as a cellular phone, or an HMD device. In some embodiments in which CGR environment 204 is an MR environment, CGR environment 204 is displayed by device 100a, where device 100a provides pass through video or has a display that is at least partially transparent.

In FIG. 2A, system 200 displays CGR environment 204 from a first position and (angular) orientation, and with a first field of view. In some embodiments, a position corresponds to a location within a CGR environment (e.g., a virtual location of a user). In the embodiment illustrated in FIG. 2A, the first position corresponds to a location in CGR environment 204 that is next to pond 212 and the orientation is in the direction of cabin 210. The field of view illustrated in FIG. 2A includes an unmagnified portion 204a of CGR environment 204.

While displaying unmagnified portion 204a illustrated in FIG. 2A, system 200 receives a first input corresponding to a request to change a magnification of the display of CGR environment 204. Changing the magnification can include increasing or decreasing the magnification (or magnification level) of the display of CGR environment or a portion thereof (e.g., by zooming in or zooming out, respectively, the display of CGR environment 204 or a portion thereof). In some embodiments, system 200 changes the magnification by adjusting the field of view (e.g., reducing the field of view increases magnification; increasing the field of view decreases magnification). For instance, the change in field of view can be computed as if the field of view would cover the entire display 202 (e.g., the computation of the field of view does not take into account the restriction of displaying a magnified portion only within a region of display 202, such as region 206 as discussed below). In some embodiments, displaying a magnified portion only within a region of display 202 reduces the effective field of view, but is not part of the calculation that determines the display of a magnified portion.

In some embodiments, the first input is an input received at an input device coupled to system 200 (e.g., a touch-sensitive surface (e.g., 122), keyboard, mouse, joystick, scroll wheel, handheld controller (e.g., with directional arrows and/or buttons), microphone(s) (e.g., 112), image sensor(s) (e.g., 108), orientation sensor(s) (e.g., 110), or the like). In some embodiments, the first input is a manual input (e.g., a button press, touch gesture on a touch-sensitive surface, rotation of a rotatable input mechanism (e.g., scroll wheel)), a body gesture (e.g., a head, arm, hand, and/or finger gesture), and/or a voice input (e.g., "zoom in").

Figure 2B:
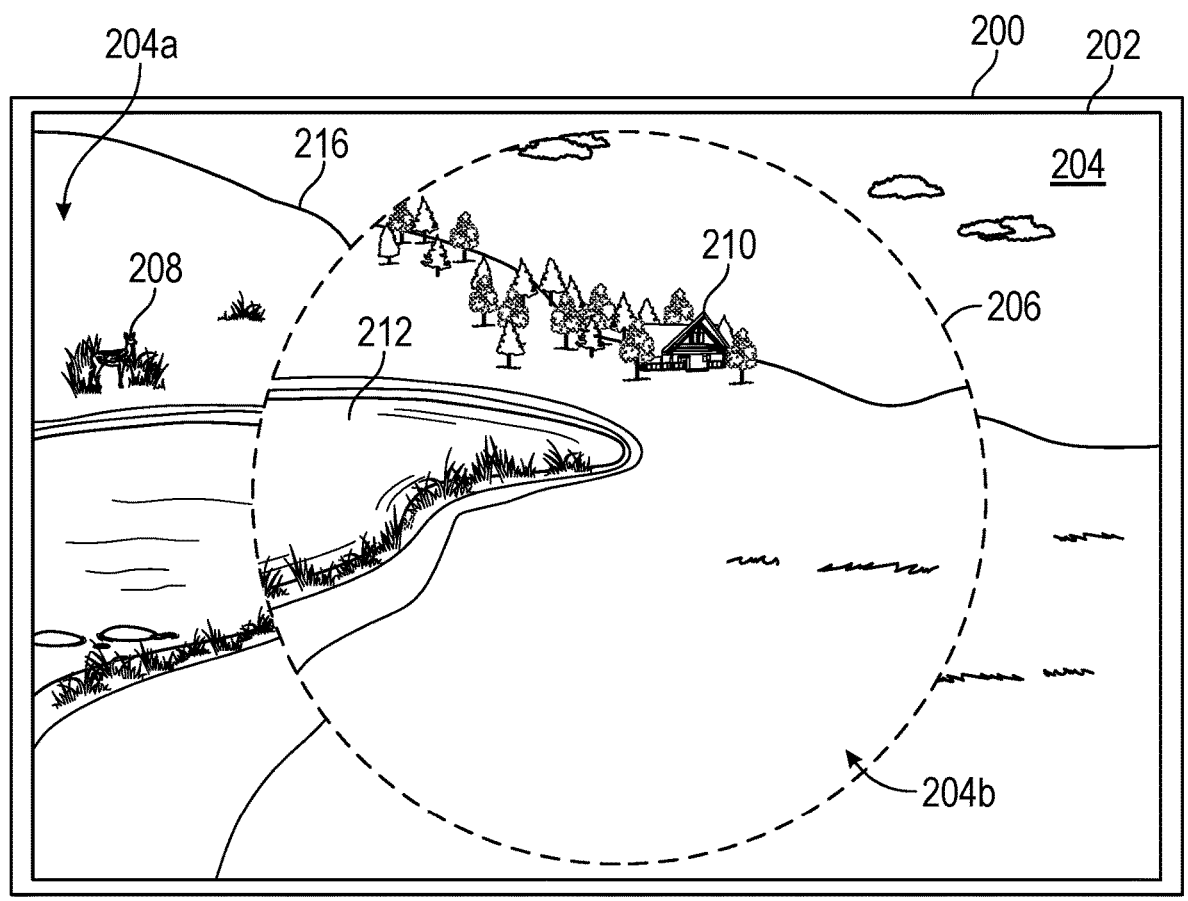

In response to receiving the first input, system 200 displays a magnified portion of CGR environment 204 from the first position. As illustrated in FIG. 2B, magnified portion 204b is displayed in a circular region 206 on display 202 in the middle of the field of view and replaces part of unmagnified portion 204a. In some embodiments, region 206 is not circular and/or is not in the middle of the field of view. In some embodiments, the position of region 206 on display 202 is based on a gaze position (e.g., region 206 is centered on the position of a user's gaze). In some embodiments, a gaze position is determined based on data collected by sensors included in system 200. In embodiments with more than one display (e.g., two displays, one for each eye), region 206 includes multiple sub-regions positioned on display 202, which are perceived as a single region when viewed by a user. In some embodiments, system 200 displays a border of region 206 (e.g., a solid line around region 206). In FIG. 2B, the broken line represents the boundary of region 206 for the purpose of illustration, but is not actually displayed on display 202.

Magnified portion 204b is displayed from the same position and orientation as unmagnified portion 204a, but is zoomed-in (displayed at a higher magnification or magnification level). In some embodiments, system 200 displays magnified portion 204b by continuously or incrementally zooming in to the magnification level displayed in FIG. 2B.

In FIG. 2B, a part of unmagnified portion 204a remains displayed, and is displayed simultaneously with magnified portion 204b. In the illustrated embodiment, the part of unmagnified portion 204a that is not replaced by magnified portion 204b surrounds magnified portion 204b and remains unchanged from FIG. 2A (e.g., deer 208 is in the same position and has the same size, compared to FIG. 2A).

Figure 2C:
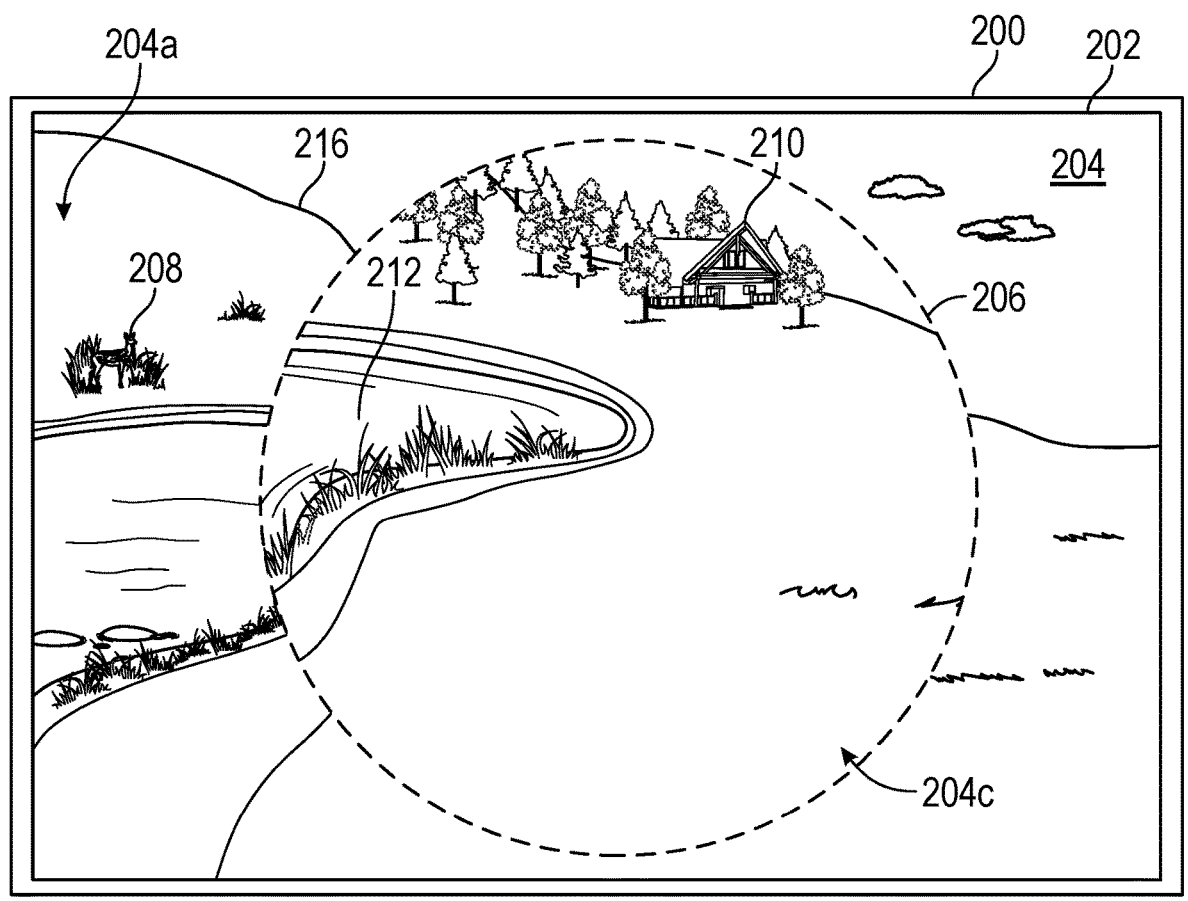

While displaying unmagnified portion 204a and magnified portion 204b, system 200 receives a second input (e.g., an input similar to, but discrete from, the first input or a continuation of the first input). In response to the second input, system 200 displays another magnified portion of CGR environment 204 from the first position. As shown in FIG. 2C, system 200 further magnifies the part of CGR environment 204 in the center of the field of view to display magnified portion 204c. In the illustrated embodiment, magnified portion 204c is displayed in region 204, the size and position of which remains the same as in FIG. 2B (e.g., magnified portion 204c replaces magnified portion 204b). Compared to magnified portion 204b in FIG. 2B, magnified portion 204c has a larger magnification level and a smaller field of view. In some embodiments, the portion of CGR environment 204 displayed in region 206 of display 202 is continuously or incrementally zoomed to the magnification level of magnified portion 204c. Compared to FIG. 2B, unmagnified portion 204a remains unchanged.

According to the features described above, a user can provide one or more inputs to obtain a magnified view of CGR environment 204 over a narrower field of view, while remaining at the first position (e.g., the same location within CGR environment 204). This provides the user with a more detailed display of an area or object of interest (e.g., an area or object that the user may wish to approach), but without having to actually move in the CGR environment. This avoid unnecessary movement of the user in the CGR environment.

Furthermore, maintaining display of unmagnified portion 204a provides consistency and context to the user while displaying the magnified portion. For example, maintaining display of unmagnified portion 204a along with magnified portion 204c indicates to the user that the user has not moved in CGR environment 204, but rather is simply being provided with a zoomed-in display of a portion of CGR environment 204 from the same position.

The response of system 200 to the inputs described above also allows a user to control the level of magnification in region 206. In some embodiments, the amount or level of magnification is proportional to the magnitude of the input(s) (e.g., the amount of scrolling or length of a touch input or hand gesture). In some embodiments, system 200 decreases the magnification in region 206 or zooms out in response to input in a manner analogous to the techniques described above for increasing magnification. For example, system 200 can decrease magnification (e.g., transition from magnified portion 204c to magnified portion 204b) in response to an input that is opposite to the input for increasing magnification (e.g., scrolling or a hand or touch gesture in the opposite direction).

Figure 2D:
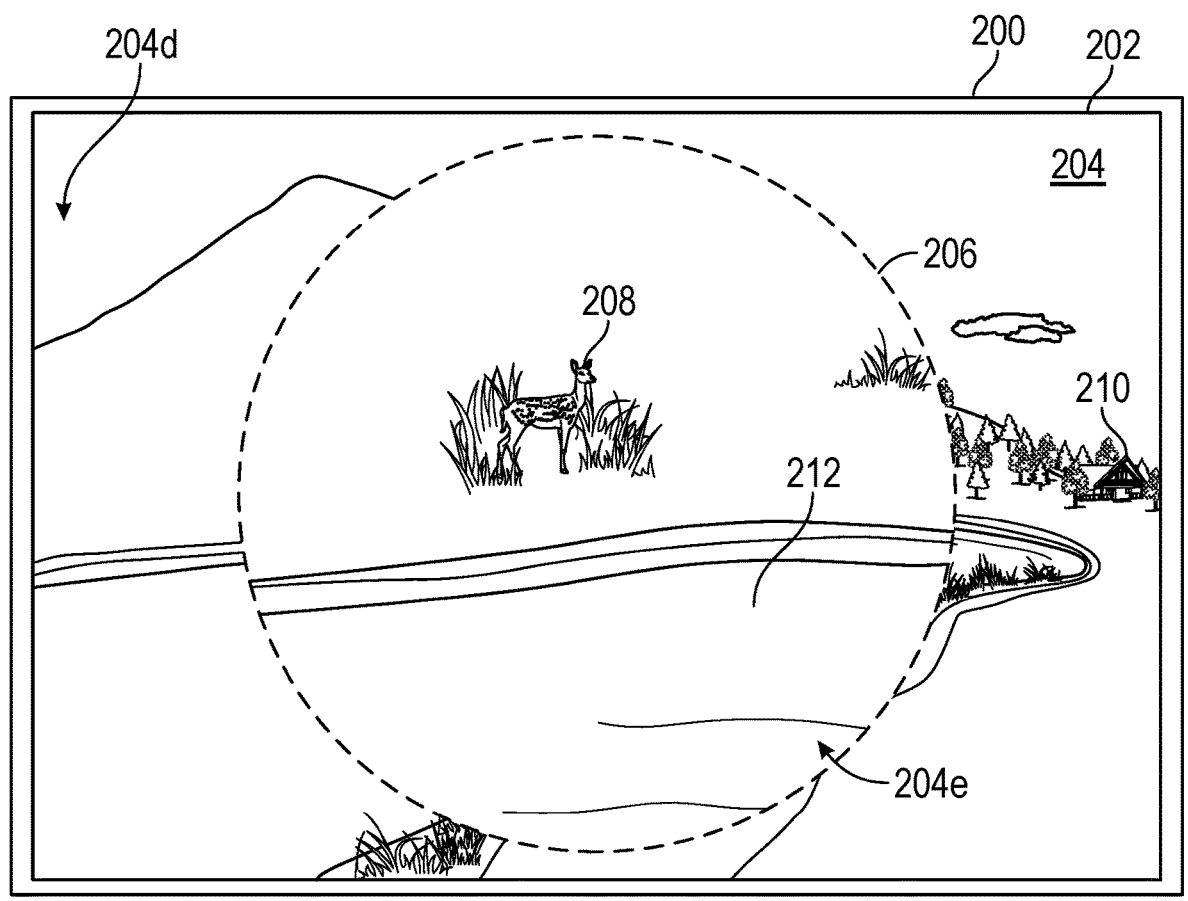

While displaying unmagnified portion 204a and magnified portion 204c, system 200 receives a third input. In some embodiments, the third input corresponds to a request to change (e.g., translate) the displayed field of view of CGR environment 204 or the orientation (e.g., without changing the position). In some embodiments, the third input is a movement (e.g., rotation or re-orientation) of system 200 or a portion thereof (e.g., as a result of a user turning his or her head while wearing an HMD). In response to receiving the third input, system 200 displays unmagnified portion 204d and magnified portion 204e, as shown in FIG. 2D. In particular, as viewed in FIGS. 2C-2D, system 200 rotates the orientation to the left. Unmagnified portion 204d and magnified portion 204e maintain the same positions on display 202 as unmagnified portion 204a and magnified portion 204c, respectively. Magnified portion 204e is displayed in region 206 and maintains the same magnification as magnified portion 204c.

FIGS. 2C-2D illustrate the capability for a user to look around CGR environment 204 with a magnified display of at least a portion of CGR environment (e.g., as if looking through a telescope). The user can do so while remaining at the first position and also maintaining context provided by an unmagnified portion of CGR environment 204 (e.g., unmagnified portion 204d).

While displaying unmagnified portion 204d and magnified portion 204e, system 200 receives a fourth input corresponding to a request to display CGR environment 204 from a different position (e.g., change the position from which CGR environment 204 is displayed). In embodiments in which the position corresponds to a location in CGR environment 204, the fourth input corresponds to a request to move to a new location in CGR environment 204 (e.g., the other side of pond 212 closer to deer 208). In some embodiments, the fourth input is a button press (e.g., a press of an "OK" or "Enter" button), a tap on a touch sensitive display, or an audible input (e.g., "move"). In some embodiments, the fourth input is different than the first input, the second input, and the third input.

Figure 2E:
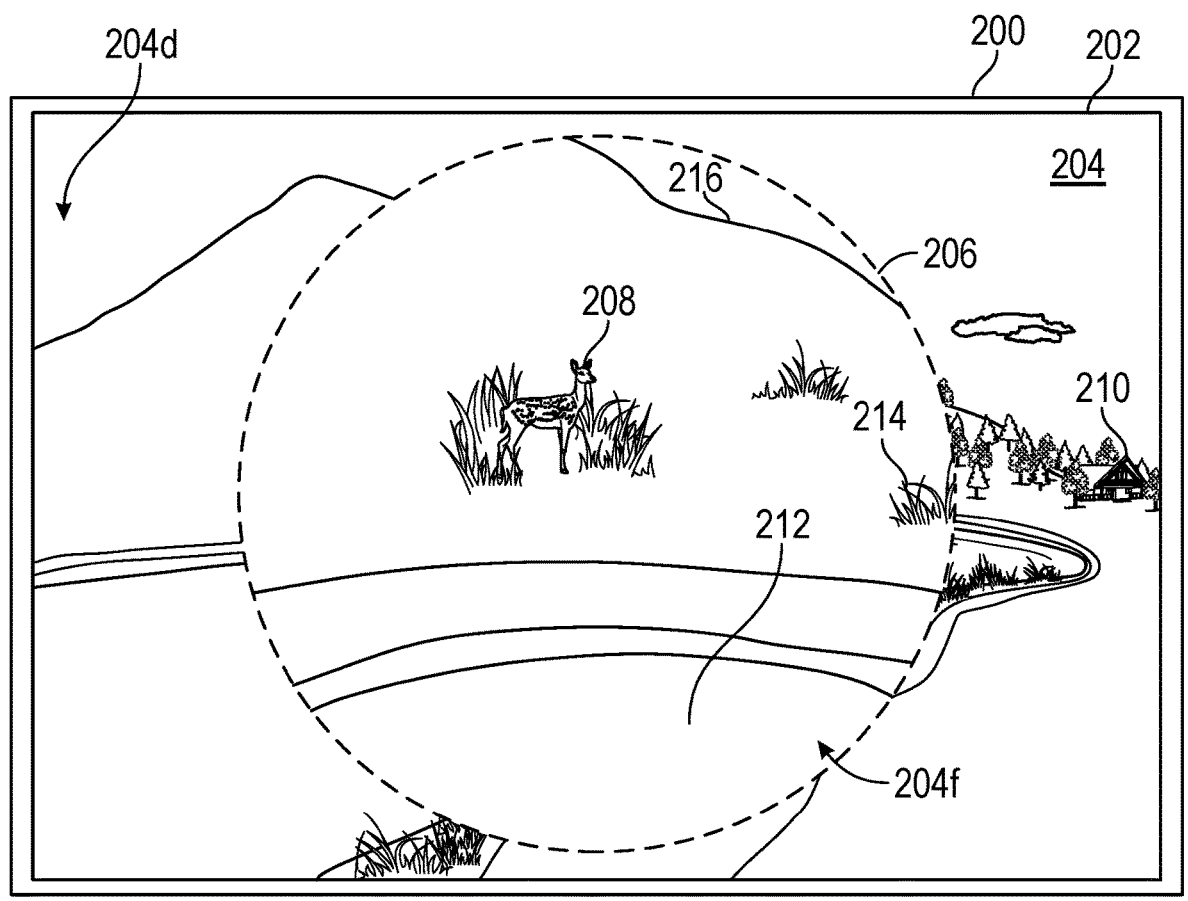
Figure 2F:
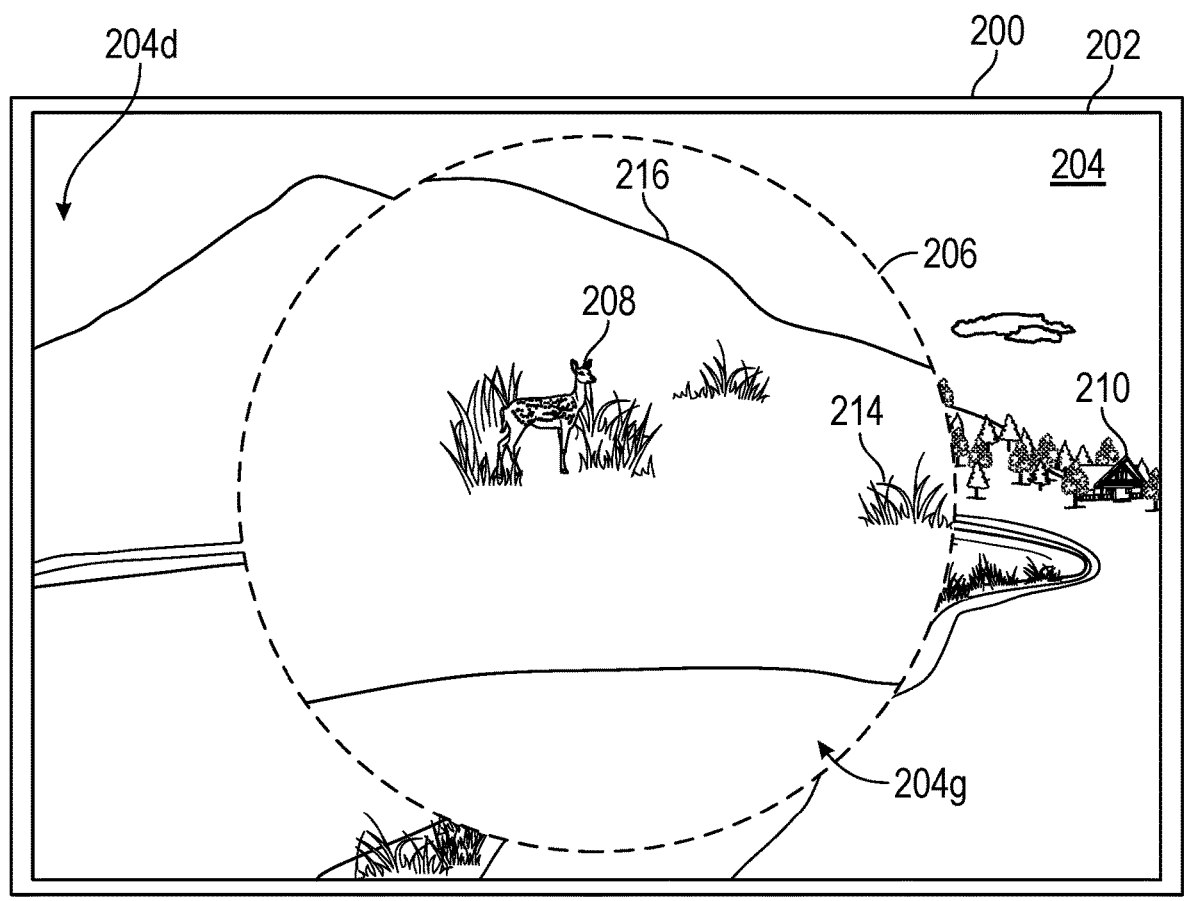

In response to receiving the fourth input, system 200 changes the position from which CGR environment is displayed. In some embodiments, in response to receiving the fourth input, system 200 displays CGR environment 204 from a position different than the first position. FIGS. 2E-2F illustrate an exemplary embodiment of transitioning the display in region 206 from a magnified view from the first position (e.g., 204e in FIG. 2D) to an unmagnified view from a new position (e.g., 204g in FIG. 2F).

In FIG. 2E, system 200 displays magnified portion 204f in region 206 (e.g., system 200 replaces magnified portion 204e with magnified portion 204f). Magnified portion 204f is from a second position in CGR environment 204 that is closer to deer 208 than the first position. In the embodiment illustrated in FIG. 2E, unmagnified portion 204d is unchanged from FIG. 2D. Continuing the transition, as shown in FIG. 2F, system 200 displays another portion 204g of CGR environment 204 in region 206 from a third position that is even closer to deer 208 than the second position in FIG. 2E (e.g., system 200 replaces magnified portion 204f with portion 204g). In some embodiments, the position changes smoothly from the first position to the third position by moving forward from the first position and orientation. For example, FIGS. 2E and 2F illustrate that in response to the fourth input, the position of CGR environment 204 displayed in region 206 is moved across pond 212 to a location closer to deer 208. However, unmagnified portion 204d still remains unchanged in FIG. 2F compared to FIGS. 2D and 2E.

In some embodiments, portion 204g is an unmagnified portion of CGR environment 204 from the third position. In such embodiments, system 200 transitions region 206 from a magnified view from the first position (e.g., 204e) to an unmagnified view from the new third position (e.g., 204g). Further, in the illustrated embodiment, system 200 changes the position from which CGR environment 204 is displayed within region 206, while maintaining and concurrently displaying unmagnified portion 204d from the first position.

In some embodiments, in response to the fourth input corresponding to a request to display CGR environment 204 from a different position, system 200 determines a focus object in region 206 (e.g., the portion of CGR environment 204 displayed at the time the fourth input is received) and moves the position towards the focus object (e.g., along a straight line between the first position and the determined focus object). In the illustrated embodiment, system 200 determines deer 208 to be the focus object and moves the position towards deer 208. In some embodiments, system 200 determines a point in CGR environment 204 (e.g., a point in the center of the field of view) and moves the position towards the determined point (e.g., if there is no particular object close to the center of the field of view at the time of the fourth input).

The embodiment illustrated in FIGS. 2E-2F also illustrates an example of a dolly zoom technique. According to the dolly zoom technique, system 200 reduces the magnification and enlarges the field of view within region 206 as the position moves forward (e.g., translates) along the center of the field of view. In some embodiments, system 200 changes the magnification, field of view, and position simultaneously.

As discussed above, system 200 can determine a focus object within the magnified portion of CGR environment displayed in region 206 at the time the fourth input is received. In some embodiments, system 200 performs the dolly zoom such that the determined focus object remains displayed at the same size throughout the dolly zoom. In the illustrated embodiment, system 200 determines deer 208 to be the focus object and performs the dolly zoom such that the displayed size of deer 208 remains the same (e.g., system 200 zooms out the portion of CGR environment 204 displayed in region 206 as the position moves forward from the first position according to the orientation). The reduction in magnification is offset by moving closer to the focus object. For example, deer 208 is displayed at the same size in FIGS. 2D, 2E, and 2F (magnified portions 204e and 204f and unmagnified portion 204g) by reducing the magnification within region 206 as the position gets closer to deer 208.

As mentioned, in some embodiments, the dolly zoom technique also increases the field of view as the position moves. For example, the field of view displayed in region 206 is enlarged as the position is moved (e.g., to keep region 206 fully populated). In the transition from the first position to the second position illustrated by FIGS. 2D-2E, the field of view is enlarged. The enlarged field of view is illustrated by the display of bush 214 and the sky above mountain 216 in region 206 in FIG. 2E, as compared to FIG. 2D. As the position continues to move from the second position to the third position (the transition from FIG. 2E to FIG. 2F), the field of view continues to enlarge, as indicated by more of bush 214 and more sky above mountain 216 being displayed in region 206 in FIG. 2F, as compared to FIG. 2E.

In some embodiments, system 200 determines the third position based on the magnification level of the magnified portion of CGR environment at the time system 200 receives the fourth input. For example, the third position (corresponding to unmagnified portion 204g) is determined based on the magnification level of magnified portion 204e in region 206 at the time the fourth input is received. In some embodiments, the change in position (e.g., the distance between the first position and the third position in CGR environment 204) is directly proportional to the level of magnification (e.g., the more region 206 is zoomed in, the farther forward the position moves).

In some embodiments, system 200 determines the distance from an initial position (e.g., the first position) to a new position (e.g., the second or third position) based on the field of view FOV0 of system 200 (e.g., the field of view of unmagnified portion 204a), a distance d1 from the initial position to a focus object, a starting zoom factor m1, and a new zoom factor m2, where the zoom factors are values greater than zero and less than or equal to one. The field of view FOV0 of the unmagnified portion of CGR environment 204 (e.g., the horizontal field of view of 204a or 204d) is multiplied by starting zoom factor m1 to compute FOV1, which is the field of view that the magnified portion (e.g., 204e) would have if it were to occupy the entire display 202 (e.g., limiting the magnified portion to region 206 reduces the effective field of view of the magnified portion). A new field of view FOV2 that is to be displayed at the new position is computed by multiplying the field of view FOV0 of the unmagnified portion of CGR environment 204 (e.g., the field of view of 204a or 204d) times new zoom factor m2. The distance d2 from the focus object to the new position is computed by dividing the tangent of one-half of FOV1 (i.e., tan(0.5*FOV1)) by the tangent of one-half of FOV2 (i.e., tan(0.5*FOV2)) and then multiplying the result (i.e., quotient) by distance d1 from the initial position to the focus object. The distance from the initial position to the new position (e.g., the distance that a user moves in the CGR environment) is the difference between distance d1 from the initial position to the focus object and distance d2 from the new position to the focus object. This embodiment maintains the displayed size of the focus object (e.g., the displayed size of the focus object is the same in magnified portion 204e, 204f, 204g, 204h, and 204i). In some embodiments, m1 is less than one (e.g., 204e) and m2 is equal to 1 (e.g., 204g).

Figure 2G:
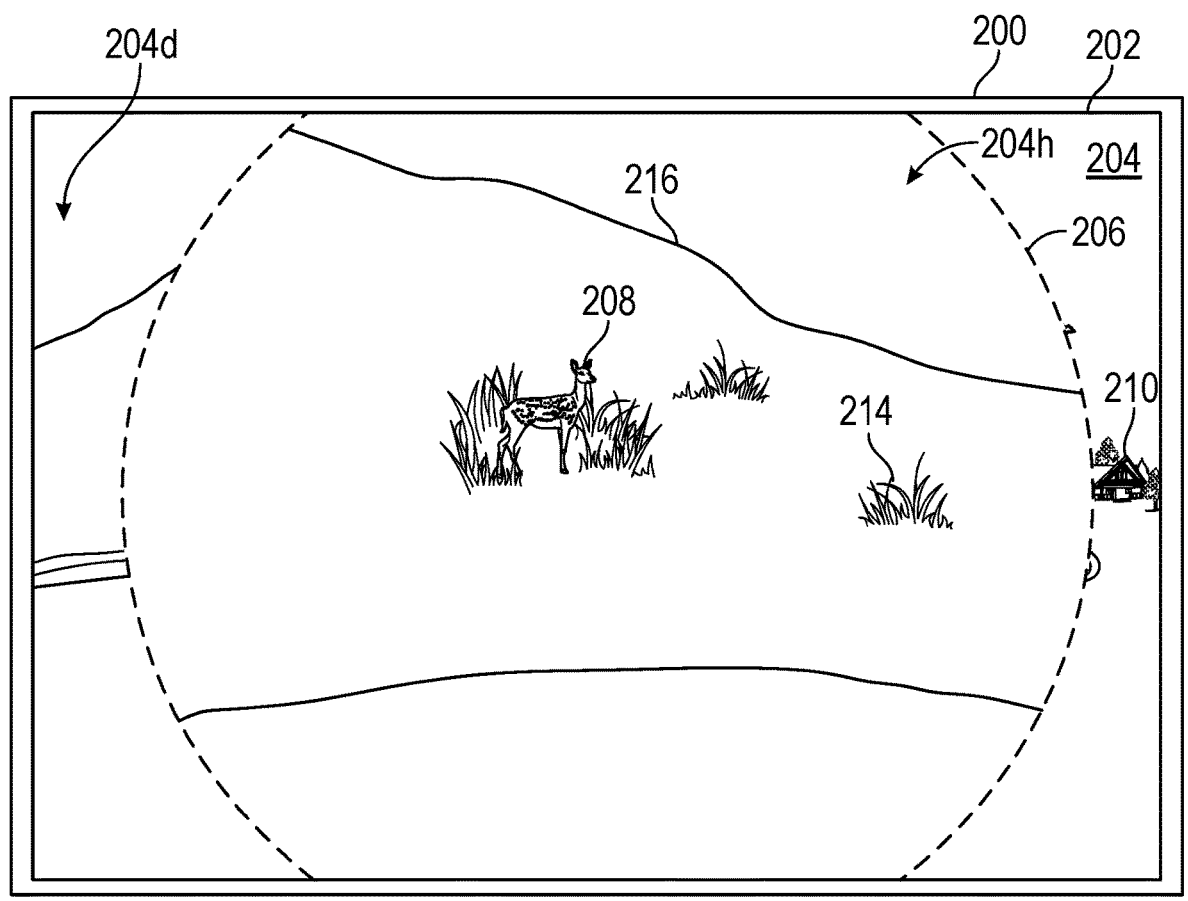

Turning to FIG. 2G, system 200 expands region 206 to display portion 204h of CGR environment 204. Portion 204h is an unmagnified portion of CGR environment 204 from the third position with a larger field of view than unmagnified portion 204g. In FIG. 2G, region 206 expands radially outward from the center of the field of view and replaces part of unmagnified portion 204d. In some embodiments, system 200 expands region 206 after the dolly zoom is complete (e.g., system 200 expands region 206 after the position has reached the third position and is no longer changing; the position of the portion of CGR environment displayed in region 206 does not change as region 206 expands). In some embodiments, system 200 begins to expand region 206 automatically once the third position is reached (e.g., after the dolly zoom effect is complete in FIG. 2F). In some embodiments, once the third position is reached, system 200 expands region 206 in response to another input (e.g., region 206 is not expanded until another input is received). In some embodiments, once the third position is reached, a user can look around CGR environment 204 (e.g., similar to FIGS. 2C-2D) before expanding region 206 (e.g., by providing an input).

Figure 2H:
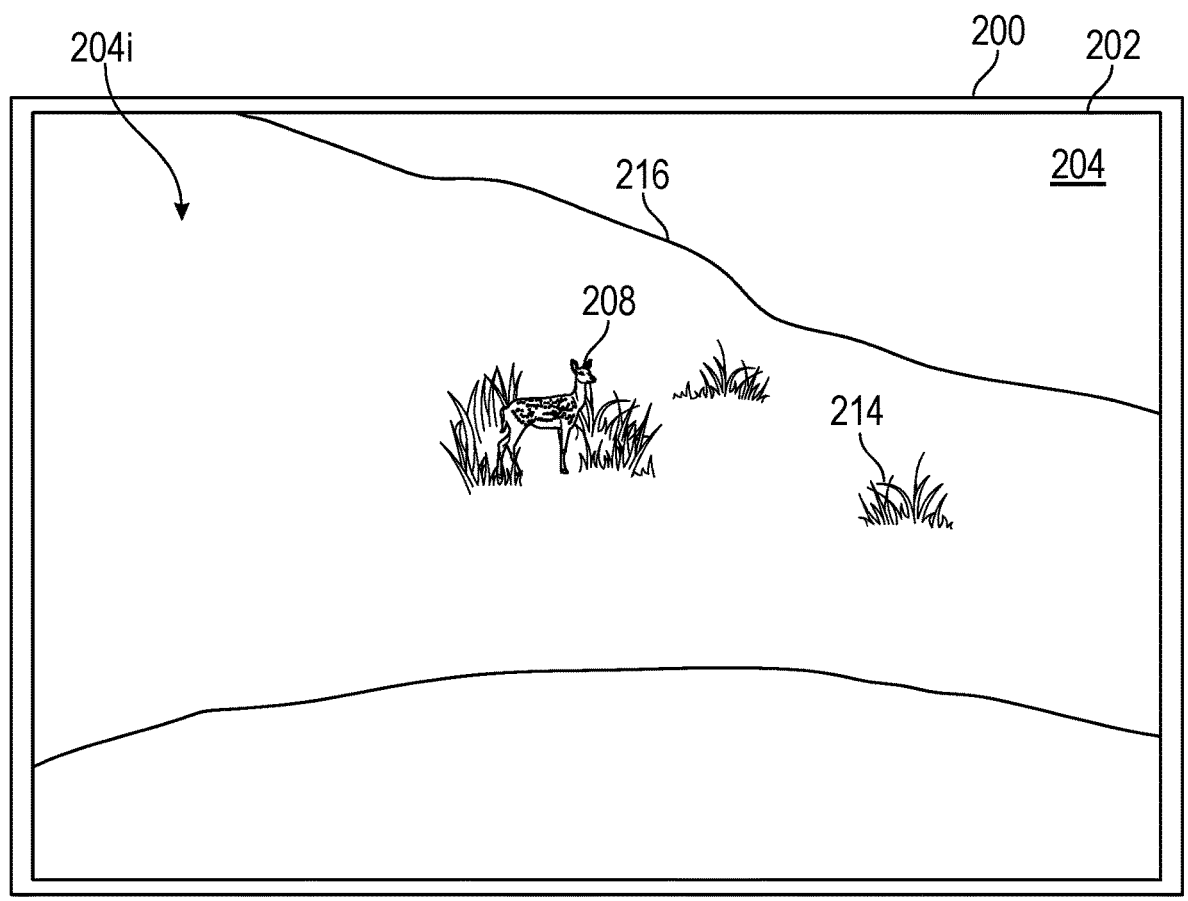

Turning to FIG. 2H, system 200 continues to expand region 206 and displays a larger field of view of CGR environment 204 from the third position. In the illustrated embodiment, system 200 expands region 206 until an unmagnified portion 204i from the third position completely replaces unmagnified portion 204d from the first position (e.g., system 200 replaces unmagnified portion 204d with unmagnified portion 204i from the third position). In FIG. 2H, the display of CGR environment 204 on display 202 is entirely from the third position.

In some embodiments, displaying unmagnified portion 204i in FIG. 2H completes movement in CGR environment 204 from the first position to the third position. Once display 202 is completely occupied by unmagnified portion 204i, system 200 can display magnified portions of CGR environment 204 from the third position, change the orientation while staying at the third position, and/or move from the third position to another position according to the techniques described above with reference to FIGS. 2A-2H (e.g., unmagnified portion 204i and the state of system 200 in FIG. 2H is analogous to unmagnified portion 204a and the state of system 200 illustrated in FIG. 2A).

The techniques described above allow a user to move about CGR environment 204, and further, to control where to move within CGR environment 204. For example, a user can zoom-in to preview a portion of CGR environment 204 with more detail. If, for example, the user is not interested in the magnified portion, the user can change the orientation to preview magnified portions of CGR environment 204 in other directions. In addition to selecting a particular orientation, the user can adjust the magnification in region 206 by zooming in or out to set how far to move in the current direction. For example, a user can zoom in to move farther (e.g., closer to an object of interest) or zoom out to travel less distance (e.g., remain closer to the current location). A user can estimate roughly how far the position will move knowing that the position will move to a location at which objects in the magnified portion in region 206 will appear approximately the same size without magnification at the new position.

Turning now to FIG. 3, a flow chart of exemplary process 300 for moving about a CGR environment is depicted. Process 300 can be performed using a device (e.g., 100a or 200). The device is, for example, a handheld mobile device, a head-mounted device, or a head-up device. In some embodiments, process 300 is performed using two or more electronic devices, such as a device that is communicatively coupled to another device, such as a base device. In these embodiments, the operations of process 300 are distributed in any manner between the two or more devices. In some embodiments, the device causes one or more of the steps in process 300 to be performed instead of, or in addition to, performing the step itself (e.g., the device causes a remote device to display various features of process 300, such as by sending instructions to the remote device). Further, the display of the device can be transparent or opaque. Process 300 can be applied to CGR applications, including virtual reality and mixed reality applications. Although the blocks of process 300 are depicted in a particular order in FIG. 3, these blocks can be performed in other orders. Further, one or more blocks of process 300 can be partially performed, optionally performed, omitted, and/or combined with another block(s). Additional blocks can also be performed.

At block 302, the device displays a magnified portion (e.g., 204b, 204c, or 204e) of the CGR environment (e.g., 204) from a first position and an unmagnified portion (e.g., 204a or 204d) of the CGR environment from the first position (e.g., the position of portions 204a-204e). In some embodiments, the device displays the magnified portion of the CGR environment in response to receiving an input (e.g., a scroll input; see, e.g., the transition from FIG. 2A to FIG. 2B or FIG. 2C). In some embodiments, the magnified portion of the CGR environment from the first position is displayed concurrently with the unmagnified portion of the CGR environment from the first position (see, e.g., FIGS. 2B-2D). For example, the magnified portion is displayed in the center of the field of view and is surrounded by the unmagnified portion (see, e.g., FIGS. 2B-2D).

In some embodiments, the magnified portion of the CGR environment from the first position is a first magnified portion of the CGR environment from the first position, and the unmagnified portion of the CGR environment from the first position is a first unmagnified portion of the CGR environment from the first position (see, e.g., FIG. 2D). In accordance with some such embodiments, before displaying the first magnified portion (e.g., 204e) of the CGR environment from the first position and before displaying the first unmagnified portion (e.g., 204d) of the CGR environment from the first position, the device displays a second magnified portion (e.g., 204c) of the CGR environment from the first position that is different than the first magnified portion (e.g., 204e) of the CGR environment from the first position and displays, concurrently with the second magnified portion (e.g., 204c) of the CGR environment from the first position, a second unmagnified portion (e.g., 204a) of the CGR environment from the first position that is different than the first unmagnified portion (e.g., 204d) of the CGR environment from the first position. For example, the device can display a magnified portion of the CGR environment along a first orientation from the first position (e.g., FIG. 2C) and then (e.g., in response to receiving an input) move to an orientation corresponding to the first magnified portion of the CGR environment (see, e.g., FIG. 2D).

At block 304, the device receives an input. At block 306, the device displays (e.g., in response to receiving the input) a magnified portion (e.g., 204f) of the CGR environment from a second position (e.g., the position of portion 204f). In some embodiments, the magnified portion (e.g., 204f) from the second position replaces the magnified portion (e.g., 204e) from the first position by translating from the first position to the second position (see, e.g., the transition from FIG. 2D to FIG. 2E). In some embodiments, the magnified portion (e.g., 204f) of the CGR environment from the second position has a magnification less than a magnification of the magnified portion (e.g., 204e) of the CGR environment from the first position. For example, the device zooms out as the position moves forward. In some embodiments, the magnified portion (e.g., 204f) of the CGR environment from the second position has a field of view greater than a field of view of the magnified portion (e.g., 204e) of the CGR environment from the first position. For example, the device expands the field of view as the position moves forward.

At block 308, the device displays a first unmagnified portion (e.g., 204g) of the CGR environment from a third position (e.g., the position of portions 204g-204i). In some embodiments, the first unmagnified portion (e.g., 204g) of the CGR environment from the third position has a field of view greater than the field of view of the magnified portion (e.g., 204f) of the CGR environment from the second position. In some embodiments, the third position is based on the magnification of the magnified portion (e.g., 204c or 204e) of the CGR environment from the first position. For example, the distance in the CGR environment from the first position to the third position is directly proportional to the magnification when the input is received (e.g., the greater the magnification, the further the position is moved). In some embodiments, the currently displayed position is translated from the first position to the third position through the second position. For example, the position translates forward in the CGR environment while the field of view is expanded and the magnification is reduced (e.g., the device simultaneously translates the position, expands the field of view, and reduces the magnification). In some embodiments, the unmagnified portion (e.g., 204*d*) of the CGR environment from the first position is displayed concurrently with the first unmagnified portion (e.g., 204*g*) of the CGR environment from the third position (see, e.g., FIG. 2F).

In some embodiments, the device determines the third position based on an orientation corresponding to the magnified portion of the CGR environment from the first position. In some embodiments, the third position is in the center of the magnified portion (e.g., the center of region 206).

In some embodiments, the device determines (e.g., in response to receiving the input in block 304) a focus object (e.g., object 208) within the magnified portion of the CGR environment from the first position and determines the third position based on the determined focus object. For example, the device determines a focus object, such as the object nearest the center of the field of view or an object at a gaze position (which might be different than the center of the field of view, e.g., if a user is not looking at the center of display 202)), and then moves the position directly toward the focus object. In some embodiments, the device maintains the displayed size of the focus object (e.g., object 208 stays the same size in FIGS. 2D-2H). For example, the device displays the focus object at the same size in the magnified portion of the CGR environment from the first position, the unmagnified portion of the CGR environment from the second position, and the unmagnified portion of the CGR environment from the third position.

At block 310 (e.g., after displaying the first unmagnified portion of the CGR environment from the third position), the device displays a second unmagnified portion (e.g., 204*h* or 204*i*) of the CGR environment from the third position. In some embodiments, the second unmagnified portion of the CGR environment from the third position has a field of view greater than the field of view of the first unmagnified portion (e.g., 204*g*) of the CGR environment from the third position. For example, the device expands the field of view of the unmagnified portion of the CGR environment from the third position (e.g., by enlarging region 206) to replace the unmagnified portion (e.g., 204*a* or 204*d*) from the first position. In some embodiments, the device replaces the unmagnified portion of the CGR environment from the first position (e.g., a portion of the CGR environment displayed along the outer portion of display 202) with the second unmagnified portion of the CGR environment from the third position.

Executable instructions for performing the features of method 300 described above are, optionally, included in a transitory or non-transitory computer-readable storage medium (e.g., memory(ies) 106) or other computer program product configured for execution by one or more processors (e.g., processor(s) 102).

What is claimed is:

1. An electronic device, comprising:
one or more processors; and
memory storing one or more programs configured to be executed by the one or more processors, the one or more programs including instructions for:
displaying a magnified portion of a computer-generated reality (CGR) environment corresponding to a magnified view from a first position and an unmagnified portion of the CGR environment corresponding to an unmagnified view from the first position;
receiving an input; and
in response to receiving the input:
displaying a magnified portion of the CGR environment corresponding to a magnified view from a second position, wherein the magnified portion of the CGR environment corresponding to the magnified view from the second position has a magnification less than a magnification of the magnified portion of the CGR environment corresponding to the magnified view from the first position, and wherein the magnified portion of the CGR environment corresponding to the magnified view from the second position has a field of view greater than a field of view of the magnified portion of the CGR environment corresponding to the magnified view from the first position;
after displaying the magnified portion of the CGR environment corresponding to the magnified view from the second position, displaying a first unmagnified portion of the CGR environment corresponding to an unmagnified view from a third position, wherein the first unmagnified portion of the CGR environment corresponding to the unmagnified view from the third position has a field of view greater than the field of view of the magnified portion of the CGR environment corresponding to the magnified view from the second position; and
after displaying the first unmagnified portion of the CGR environment corresponding to the unmagnified view from the third position, displaying a second unmagnified portion of the CGR environment corresponding to the unmagnified view from the third position, wherein the second unmagnified portion of the CGR environment corresponding to the unmagnified view from the third position has a field of view greater than the field of view of the first unmagnified portion of the CGR environment corresponding to the unmagnified view from the third position.

2. The electronic device of claim 1, the one or more programs further including instructions for:
before displaying the magnified portion of the CGR environment corresponding to the magnified view from the first position, receiving a second input; and
in response to receiving the second input, displaying the magnified portion of the CGR environment corresponding to the magnified view from the first position.

3. The electronic device of claim 1, wherein displaying the second unmagnified portion of the CGR environment corresponding to the unmagnified view from the third position includes replacing the unmagnified portion of the CGR environment corresponding to the unmagnified view from the first position with the second unmagnified portion of the CGR environment corresponding to the unmagnified view from the third position.

4. The electronic device of claim 1, wherein the third position is based on the magnification of the magnified portion of the CGR environment corresponding to the magnified view from the first position.

5. The electronic device of claim 1, wherein the magnified portion of the CGR environment corresponding to the magnified view from the first position is displayed concurrently with the unmagnified portion of the CGR environment corresponding to the unmagnified view from the first position.

6. The electronic device of claim 1, wherein displaying the first unmagnified portion of the CGR environment corresponding to the unmagnified view from the third position includes translating a currently displayed position from the first position to the third position through the second position.

7. The electronic device of claim 1, wherein the unmagnified portion of the CGR environment corresponding to the unmagnified view from the first position is displayed concurrently with the first unmagnified portion of the CGR environment corresponding to the unmagnified view from the third position.

8. The electronic device of claim 1, wherein:
the magnified portion of the CGR environment corresponding to the magnified view from the first position is a first magnified portion of the CGR environment corresponding to the magnified view from the first position,
the unmagnified portion of the CGR environment corresponding to the unmagnified view from the first position is a first unmagnified portion of the CGR environment corresponding to the unmagnified view from the first position, and
the one or more programs further include instructions for:
before displaying the first magnified portion of the CGR environment corresponding to the magnified view from the first position and before displaying the first unmagnified portion of the CGR environment corresponding to the unmagnified view from the first position:
displaying a second magnified portion of the CGR environment corresponding to the magnified view from the first position that is different than the first magnified portion of the CGR environment corresponding to the magnified view from the first position; and
displaying, concurrently with the second magnified portion of the CGR environment corresponding to the magnified view from the first position, a second unmagnified portion of the CGR environment corresponding to the unmagnified view from the first position that is different than the first unmagnified portion of the CGR environment corresponding to the unmagnified view from the first position.

9. The electronic device of claim 1, the one or more programs further including instructions for:
determining the third position based on an orientation corresponding to the magnified portion of the CGR environment corresponding to the magnified view from the first position.

10. The electronic device of claim 1, the one or more programs further including instructions for:
determining a focus object within the magnified portion of the CGR environment corresponding to the magnified view from the first position; and
determining the third position based on the focus object.

11. The electronic device of claim 10, wherein:
the focus object is displayed at a first size in the magnified portion of the CGR environment corresponding to the magnified view from the first position;
the focus object is displayed at the first size in the unmagnified portion of the CGR environment corresponding to the unmagnified view from the second position; and
the focus object is displayed at the first size in the unmagnified portion of the CGR environment corresponding to the unmagnified view from the third position.

12. A non-transitory computer-readable storage medium storing one or more programs configured to be executed by one or more processors of an electronic device, the one or more programs including instructions for:
displaying a magnified portion of a computer-generated reality (CGR) environment corresponding to a magnified view from a first position and an unmagnified portion of the CGR environment corresponding to an unmagnified view from the first position;
receiving an input; and
in response to receiving the input:
displaying a magnified portion of the CGR environment corresponding to a magnified view from a second position, wherein the magnified portion of the CGR environment corresponding to the magnified view from the second position has a magnification less than a magnification of the magnified portion of the CGR environment corresponding to the magnified view from the first position, and wherein the magnified portion of the CGR environment corresponding to the magnified view from the second position has a field of view greater than a field of view of the magnified portion of the CGR environment corresponding to the magnified view from the first position;
after displaying the magnified portion of the CGR environment corresponding to the magnified view from the second position, displaying a first unmagnified portion of the CGR environment corresponding to an unmagnified view from a third position, wherein the first unmagnified portion of the CGR environment corresponding to the unmagnified view from the third position has a field of view greater than the field of view of the magnified portion of the CGR environment corresponding to the magnified view from the second position; and
after displaying the first unmagnified portion of the CGR environment corresponding to the unmagnified view from the third position, displaying a second unmagnified portion of the CGR environment corresponding to the unmagnified view from the third position, wherein the second unmagnified portion of the CGR environment corresponding to the unmagnified view from the third position has a field of view greater than the field of view of the first unmagnified portion of the CGR environment corresponding to the unmagnified view from the third position.

13. The non-transitory computer-readable storage medium of claim 12, the one or more programs further including instructions for:
before displaying the magnified portion of the CGR environment corresponding to the magnified view from the first position, receiving a second input; and
in response to receiving the second input, displaying the magnified portion of the CGR environment corresponding to the magnified view from the first position.

14. The non-transitory computer-readable storage medium of claim 12, wherein displaying the second unmagnified portion of the CGR environment corresponding to the unmagnified view from the third position includes replacing the unmagnified portion of the CGR environment corresponding to the unmagnified view from the first position with the second unmagnified portion of the CGR environment corresponding to the unmagnified view from the third position.

15. The non-transitory computer-readable storage medium of claim 12, wherein the third position is based on the magnification of the magnified portion of the CGR environment corresponding to the magnified view from the first position.

16. The non-transitory computer-readable storage medium of claim 12, wherein the magnified portion of the CGR environment corresponding to the magnified view from the first position is displayed concurrently with the unmagnified portion of the CGR environment corresponding to the unmagnified view from the first position.

17. The non-transitory computer-readable storage medium of claim 12, wherein displaying the first unmagnified portion of the CGR environment corresponding to the unmagnified view from the third position includes translating a currently displayed position from the first position to the third position through the second position.

18. The non-transitory computer-readable storage medium of claim 12, wherein the unmagnified portion of the CGR environment corresponding to the unmagnified view from the first position is displayed concurrently with the first unmagnified portion of the CGR environment corresponding to the unmagnified view from the third position.

19. The non-transitory computer-readable storage medium of claim 12, wherein:
the magnified portion of the CGR environment from the first position is a first magnified portion of the CGR environment corresponding to the magnified view from the first position,
the unmagnified portion of the CGR environment from the first position is a first unmagnified portion of the CGR environment corresponding to the unmagnified view from the first position, and
the one or more programs further include instructions for:
before displaying the first magnified portion of the CGR environment corresponding to the magnified view from the first position and before displaying the first unmagnified portion of the CGR environment corresponding to the unmagnified view from the first position:
displaying a second magnified portion of the CGR environment corresponding to the magnified view from the first position that is different than the first magnified portion of the CGR environment corresponding to the magnified view from the first position; and
displaying, concurrently with the second magnified portion of the CGR environment corresponding to the magnified view from the first position, a second unmagnified portion of the CGR environment corresponding to the unmagnified view from the first position that is different than the first unmagnified portion of the CGR environment corresponding to the unmagnified view from the first position.

20. A method for moving about a computer-generated reality (CGR) environment, comprising:
displaying a magnified portion of the CGR environment corresponding to a magnified view from a first position and an unmagnified portion of the CGR environment corresponding to an unmagnified view from the first position;
receiving an input; and
in response to receiving the input:
displaying a magnified portion of the CGR environment corresponding to a magnified view from a second position, wherein the magnified portion of the CGR environment corresponding to the magnified view from the second position has a magnification less than a magnification of the magnified portion of the CGR environment corresponding to the magnified view from the first position, and wherein the magnified portion of the CGR environment corresponding to the magnified view from the second position has a field of view greater than a field of view of the magnified portion of the CGR environment corresponding to the magnified view from the first position;
after displaying the magnified portion of the CGR environment corresponding to the magnified view from the second position, displaying a first unmagnified portion of the CGR environment corresponding to an unmagnified view from a third position, wherein the first unmagnified portion of the CGR environment corresponding to the unmagnified view from the third position has a field of view greater than the field of view of the magnified portion of the CGR environment corresponding to the magnified view from the second position; and
after displaying the first unmagnified portion of the CGR environment corresponding to the unmagnified view from the third position, displaying a second unmagnified portion of the CGR environment corresponding to the unmagnified view from the third position, wherein the second unmagnified portion of the CGR environment corresponding to the unmagnified view from the third position has a field of view greater than the field of view of the first unmagnified portion of the CGR environment corresponding to the unmagnified view from the third position.

* * * * *